United States Patent
Jones et al.

(10) Patent No.: US 7,139,437 B2
(45) Date of Patent: Nov. 21, 2006

(54) METHOD AND SYSTEM FOR REMOVING ARTIFACTS IN COMPRESSED IMAGES

(75) Inventors: Paul W. Jones, Churchville, NY (US); Keith A. Jacoby, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 773 days.

(21) Appl. No.: 10/292,854

(22) Filed: Nov. 12, 2002

(65) Prior Publication Data

US 2004/0091168 A1 May 13, 2004

(51) Int. Cl.
*G06K 9/40* (2006.01)
*G06K 9/34* (2006.01)
*G06K 9/36* (2006.01)
*H04B 14/04* (2006.01)

(52) U.S. Cl. .............. 382/261; 382/173; 382/240

(58) Field of Classification Search .......... 382/248, 382/275, 252, 266, 240, 173, 180, 250–251, 382/267–270; 358/3.08
See application file for complete search history.

(56) References Cited

U.S. PATENT DOCUMENTS

| | | | | |
|---|---|---|---|---|
| 5,379,122 | A * | 1/1995 | Eschbach | 382/248 |
| 5,629,778 | A * | 5/1997 | Reuman | 382/252 |
| 6,188,799 | B1 | 2/2001 | Tan et al. | 382/260 |
| 6,360,024 | B1 | 3/2002 | Tan et al. | 382/260 |
| 6,427,031 | B1 | 7/2002 | Price | 382/264 |
| 6,628,842 | B1 * | 9/2003 | Nagao | 382/266 |
| 6,681,051 | B1 * | 1/2004 | Hoppe et al. | 382/240 |
| 6,738,524 | B1 * | 5/2004 | de Queiroz | 382/240 |
| 6,947,178 | B1 * | 9/2005 | Kuo et al. | 358/3.08 |
| 6,983,079 | B1 * | 1/2006 | Kim | 382/275 |

OTHER PUBLICATIONS

"Maximum likelihood estimation of JPEG quantization table in the identification of bitmap compression history" by Z. Fan and R. de Queiroz. Proc. IEEE Int. Conf. Image Processing (ICIP) 2000, Vancouver, Canada, Sep. 10-13, 2000.

"Digital Image Smoothing and the Sigma Filter" by J.-S. Lee. Computer Vision, Graphics, and Image Processing, vol. 24, 1983, pp. 255-269.

Billy Cahill et al: "Locally Adaptive Deblocking Filter For Low Bit Rate Video", Proceedings 2000 International Conference on Image Processing. ICIP 2000, Vancouver, CANADA, Sep. 10-13, 2000, International Conference on Image Processing, New York, NY: IEEE, US, vol. 2 of 3. Conf. 7, Sep. 10, 2000, pp. 664-667, XP010530072, ISBN: 0-7803-6298-5.

Francois-Xavier Coudoux et al: "Reduction of Blocking Effect in DCT-Coded Images Based On A Visual Perception Criteron", Signal Processing. Image Communication, Elsevier Science Publishers, AMSTERDAM, NL, vol. 11, No. 3, Jan. 1998, pp. 179-186, XP004107301 ISSN: 0923-5965.

(Continued)

*Primary Examiner*—Kanjibhai Patel
(74) *Attorney, Agent, or Firm*—David M. Woods (57) ABSTRACT

In a method for removing artifacts in a digital image that has been decoded from a compressed representation of the image, the pixels of the digital image are segmented into low detail pixels, high detail pixels, and boundary pixels, and then a single non-linear filtering method, such as a sigma filtering method, is applied to each pixel in the digital image. By selecting separate filter parameters for the low detail, high detail, and boundary pixels, the removal of artifacts is improved over prior methods.

48 Claims, 6 Drawing Sheets

OTHER PUBLICATIONS

Mahmood R. Azimi-Sadjadi et al: "Neural Network Decision Directed Edge-Adaptive Kalman Filter for Image Estimation", IEEE Transactions on Image Processing, IEEE Service Center, Piscataway, NJ, US, vol. 8, No. 4, Apr. 1999, pp. 589-592, XP000832639, ISSN: 1057-7149.

Hyun Wook Park et al: "A Postprocessing Method for Reducing Quantization Effects in Low Bit-Rate Moving Picture Coding", IEEE Transactions On Circuits and Systems For Video Technology, IEEE Service Center, Piscataway, NJ, US, vol. 9, No. 1, Feb. 1999, pp. 161-171, XP000802295, ISSN: 1051-8215.

* cited by examiner

METHOD AND SYSTEM FOR REMOVING ARTIFACTS IN COMPRESSED IMAGES

FIELD OF THE INVENTION

The invention relates generally to the field of digital image processing, and in particular to removing artifacts from compressed images.

BACKGROUND OF THE INVENTION

The JPEG (Joint Photographic Experts Group) and MPEG (Moving Picture Experts Group) standards for image compression have been adopted for many diverse digital imaging applications. A commonality between these standards is the use of the discrete cosine transform (DCT). In both JPEG and MPEG, the pixel values that represent an original image are divided into non-overlapping, contiguous 8×8 blocks. Each 8×8 block is then transformed with the DCT to produce 64 spatial frequency coefficients. The lowest frequency coefficient is termed the DC coefficient, and it is related to the mean of the original 8×8 block of pixel values. The other 63 coefficients are termed the AC coefficients, and they represent the fluctuations of the pixel values around the mean. The 8×8 DCT that is used in JPEG and MPEG is an example of a block-transform.

During the compression process, the frequency coefficients for each 8×8 block are quantized to reduce the number of possible values. The degree of quantization for each coefficient is specified by a quantization table (or q-table) that consists of 64 values, one for the DC coefficient and one for each of the 63 AC coefficients. A larger q-table value for a given coefficient indicates more quantization. The quantized coefficients are then converted to a binary representation using various encoding methods. The binary representation is the data that is stored or transmitted in a compressed file. To reconstruct an image from the compressed file, the binary representation is decoded to recover the quantized coefficients for each 8×8 block. The quantized coefficients are then dequantized to produce dequantized coefficients, which are an approximation to the original frequency coefficients. Finally, the dequantized coefficients are transformed into an 8×8 block of reconstructed pixel values using an inverse DCT.

An image that is reconstructed from a compressed file consists of the concatenation of 8×8 blocks of pixel values that have been quantized in the DCT frequency domain. The quantization of the coefficients is the mechanism that allows a tradeoff between amount of compressed data and the quality of the reconstructed image. It is well known that an image that has been compressed using the DCT can produce objectionable artifacts at high compression levels, which corresponds to high levels of quantization. These artifacts include blocking artifacts, which are primarily the result of coarse quantization of the low frequency coefficients (particularly the DC coefficient), and ringing artifacts, which are primarily the result of coarse quantization of the mid/high frequency AC coefficients. Blocking artifacts are produced largely by discrepancies between the mean values of adjacent 8×8 blocks, and these discrepancies are particularly noticeable in image regions that have low detail, i.e., regions that have slowly varying content such as sky or water. Ringing artifacts occur near edges, i.e., abrupt changes from light to dark or vice versa, and they are particularly noticeable when there is a low detail region on one or both sides of the edge. As used herein, regions that are adjacent to low detail regions are termed boundary regions.

Numerous techniques have been described in the patent and technical literature to reduce the blocking and ringing artifacts that occur at high compression levels in compressed images. Some techniques are aimed at removing only the blocking artifacts (usually termed "deblocking" techniques), while other techniques attempt to address both types of artifacts, often through the use of different processing methods for the blocking artifacts and the ringing artifacts. A common problem for all of these techniques is providing an adequate reduction in the artifacts while still preserving desirable image content.

In our experience, one of the best methods for artifact reduction is that described in commonly-assigned U.S. Pat. No. 6,427,031, "Method for removing artifacts in an electronic image decoded from a block-transform coded representation of an image," to J. R. Price. This patent is incorporated herein in its entirety by reference. Price teaches a method for artifact reduction that segments an image into low detail regions and boundary regions, and then applies different processing steps to each region. While this method provides a significant reduction in the appearance of artifacts, particularly at high compression levels, it still suffers from several disadvantages. First, the type of processing that is applied to the boundary regions can result in a blurring of desirable image content in these regions, leading to a loss in apparent sharpness. Second, the method does not adapt to the compression level, so the same processing is applied regardless of the severity of the artifacts. This lack of adaptivity is common to most artifact reduction methods, and it can lead to additional blurring of desirable image content. Third, the processing parameters for the low detail and boundary regions are chosen independently of one another, which can lead to noticeable switching artifacts at the interface of the low detail and boundary regions. Finally, the high detail regions, i.e., regions that are not low detail or boundary, are not processed even though artifacts may be present. In the high detail regions, the presence of image content that has significant activity provides a masking signal that renders the artifacts less obvious. However, it may be desirable to provide some artifact reduction in the high detail regions as well.

Thus, there is a need for an artifact reduction method that does not blur desirable image content while still providing a significant reduction in the artifacts. Moreover, the method should automatically adapt to the compression level so that the degree of artifact reduction is matched to the severity of the artifacts. Finally, the method should provide a unified framework so that the different regions (low detail, boundary, and high detail) are processed in such a way that the transitions between the regions are not objectionable in the final image.

SUMMARY OF THE INVENTION

The need is met according to the present invention by providing a method for removing compression artifacts in a digital image that has been decoded from a compressed representation of the image, where the digital image is represented by a plurality of pixels, comprising the steps of segmenting the pixels of the digital image into low detail pixels, high detail pixels, and boundary pixels; and applying a single filtering method to each pixel in the digital image, wherein separate filter parameters are selected for the low detail, high detail, and boundary pixels.

In a preferred embodiment, the single filtering method is implemented by a non-linear filter, such as a sigma filter, and the filter parameters include a dependence upon the compression parameters that were used in producing the compressed representation of the image.

The present invention provides improved blocking and ringing artifact removal without overly smoothing desirable image content. The degree of artifact removal is varied with the compression level to achieve the highest possible image quality regardless of the severity of the artifacts.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, a preferred embodiment of the present invention will be described in terms that would ordinarily be implemented as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

In the following description, the present invention is described using a JPEG-compressed image as the preferred example. It is understood by those skilled in the art that the same method can be applied to an image or sequence of images that have been compressed using other techniques, e.g., MPEG or motion JPEG, that employ the DCT and similar transforms, as well as more recent techniques such as JPEG 2000 that employ the discrete wavelet transform.

Likewise, the present invention is described as it applies to a monochrome image or a single channel of a color image, e.g., the luminance channel. It is understood by those skilled in the art that the method can be extended to provide artifact reduction in the other color channels, i.e., the chrominance channels, and specifically, such extensions as described in U.S. Pat. No. 6,427,031.

Figure 1:
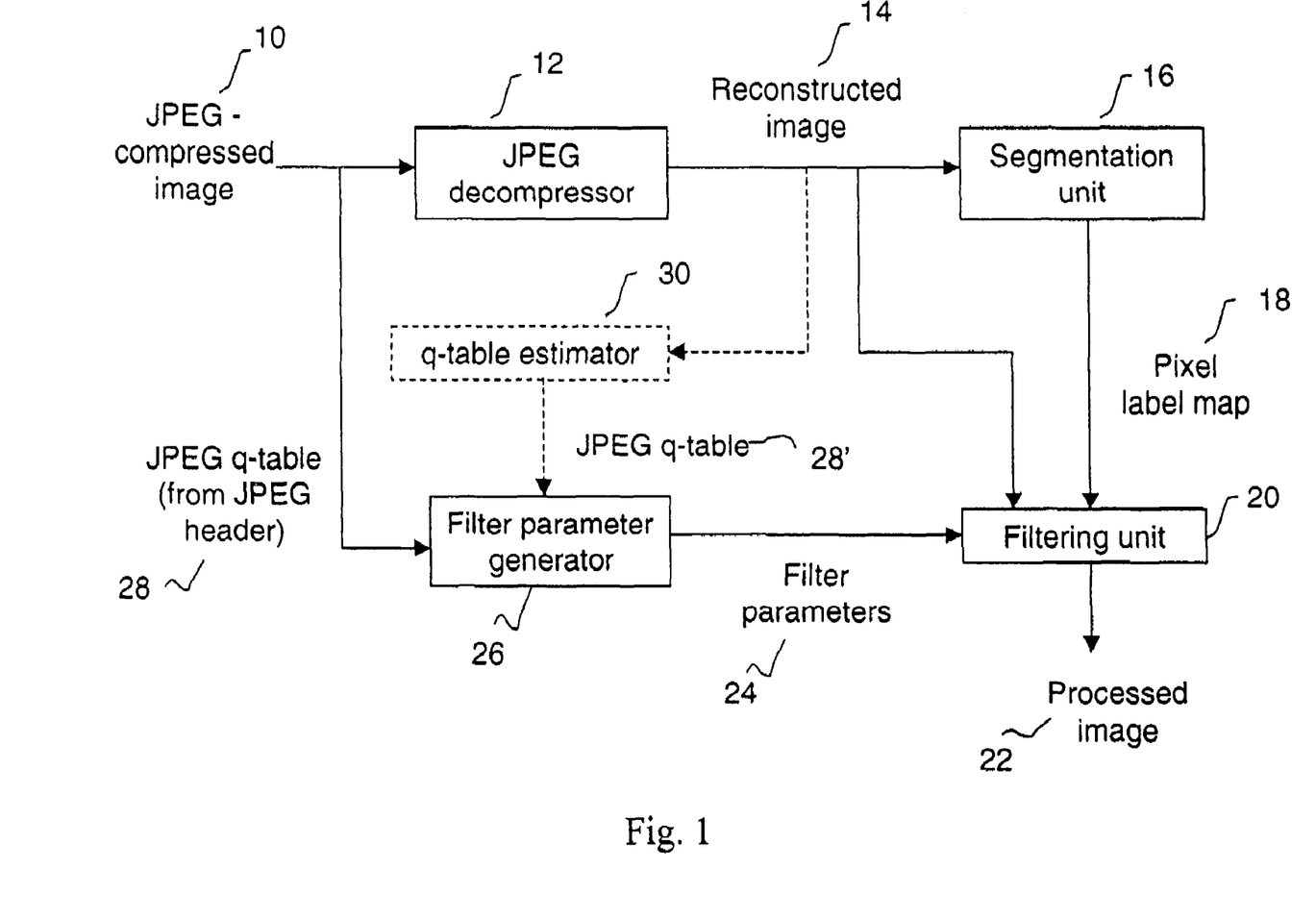
FIG. 1 is a block diagram illustrating an overview of the present invention.

Referring to FIG. 1, there is shown a block diagram that illustrates the basic components of the present invention. A JPEG-compressed image 10 is first decompressed using a JPEG decompressor 12 to form a reconstructed digital image 14. The reconstructed image consists of an M×N array of pixel values, which are sent to a segmentation unit 16 that produces a pixel label map 18 that labels each pixel as low detail, boundary, or high detail. The operation of the segmentation unit will be described shortly. The reconstructed image pixel values and their associated labels are sent to a filtering unit 20, which processes the pixel values to produce a processed image 22 that has reduced blocking and ringing artifacts as compared to the reconstructed image 14. The operation of the filtering unit also will be described shortly. The filtering unit 20 receives filter parameters 24 from a filter parameter generator 26, and separate parameters are provided for the low detail, boundary, and high detail pixels. The filter parameters 24 control the operation of the filtering unit 20 for each pixel in accordance with its associated label. The filter parameter generator 26 determines the filter parameters for the low detail, boundary, and high detail pixels and is responsive to different compression levels. Further details of the filter parameter generator will be described shortly. To achieve this adaptivity, the filter parameter generator 26 requires information about the compression level of the JPEG-compressed file in the form of the q-table 28 from the header of the JPEG-compressed file, or the q-table 28' can be estimated from the reconstructed image in the absence of the JPEG-compressed file using a q-table estimator 30. Techniques for estimating the q-table from a reconstructed image have been described in the technical literature and are known by those skilled in the art. An example of a q-table estimation technique is "Maximum likelihood estimation of JPEG quantization table in the identification of bitmap compression history," Z. Fan and R. de Queiroz, *Proc. IEEE Int. Conf Image Processing (ICIP)* 2000, Vancouver, Canada, Sep. 10–13, 2000.

Figure 2:
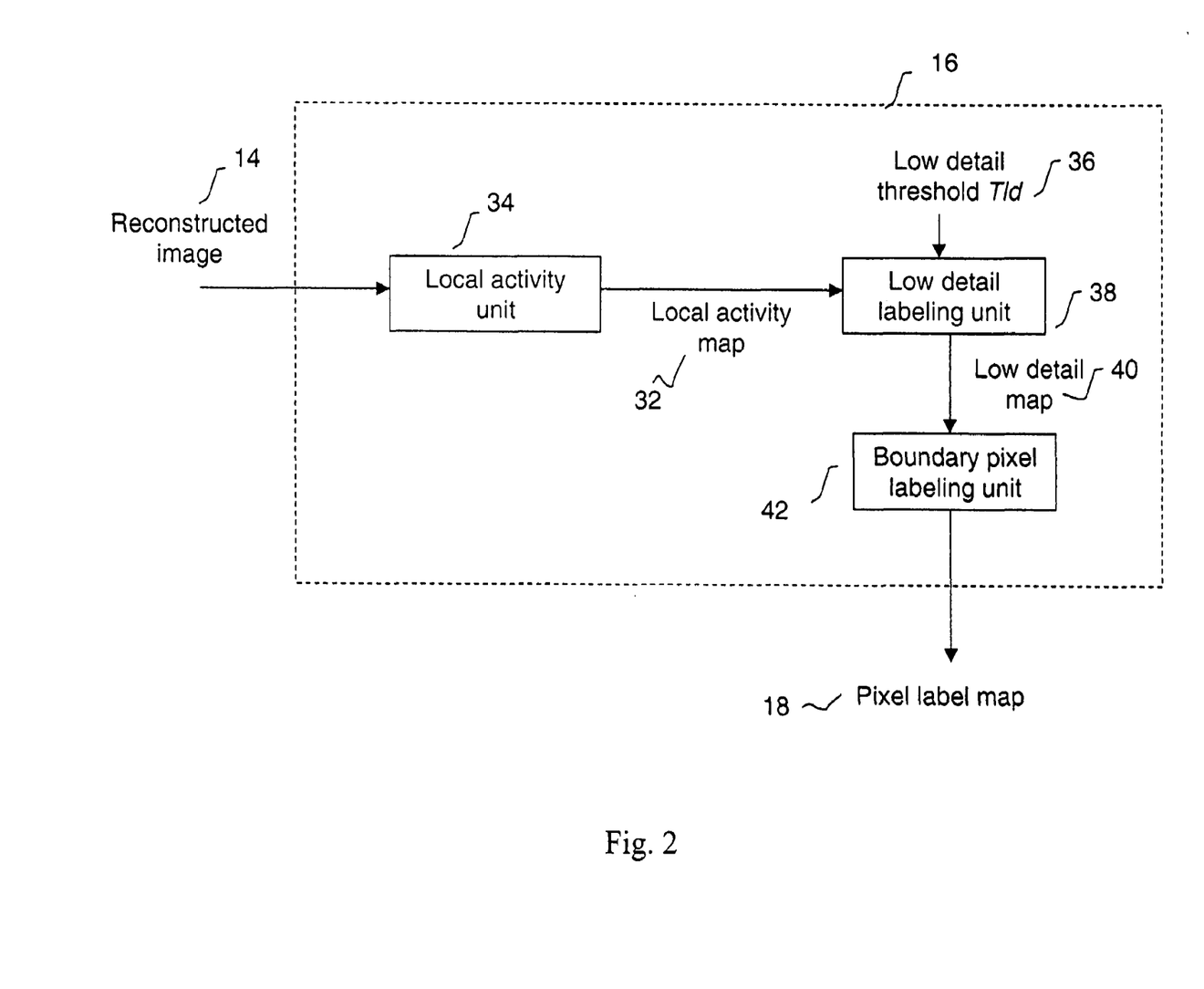
FIG. 2 is a block diagram illustrating the operation of a segmentation unit for labeling the image pixels.

Referring to FIG. 2, a block diagram is shown that illustrates the detailed operation of the segmentation unit 16. The reconstructed image 14 is received as an input to the segmentation unit, and a local activity map 32 is computed from the reconstructed image using a local activity unit 34. The local activity map specifies a local activity value for each pixel in the reconstructed image, and it can be computed in numerous ways. As described in U.S. Pat. No. 6,427,031 by Price, one method for computing the local activity is to use gradients, which are smoothed with a 9×9 Gaussian filter to reduce noise and diffuse large gradients in order to produce a more robust pixel label map. Other methods for computing the local activity map will be obvious to those skilled in the art, including computing the variance for each pixel value using an m×m window that is centered on the pixel. Typical values for m are 3, 5, 7, or 9, and larger values for m may eliminate the need for a subsequent smoothing step. The local activity map 32 is then compared to a predetermined threshold $T_{ld}$ 36 using a low detail labeling unit 38, and if the local activity value is less than or equal to the threshold, the corresponding pixel is labeled as a low detail pixel. The result of this threshold comparison process is a low detail map 40.

Boundary pixels are then identified from the low detail pixel map using a boundary labeling unit 42 as described in U.S. Pat. No. 6,427,031. A k×k window is centered over every pixel that has not been labeled as low detail, and if more than one low detail pixel is contained within the k×k window, the pixel on which the window is centered is labeled as a boundary pixel. Typical values for k are 13, 15, 17, or 19.

Any pixel that has not been labeled as either low detail or boundary is labeled as high detail. For convenience in subsequent processing of the image, a pixel label map 18 is generated by assigning a numerical value to each of the pixel types. For example, a high detail pixel has a label of 0, a low detail pixel has a label of 1, and a boundary pixel has a label of 2.

Figure 3:
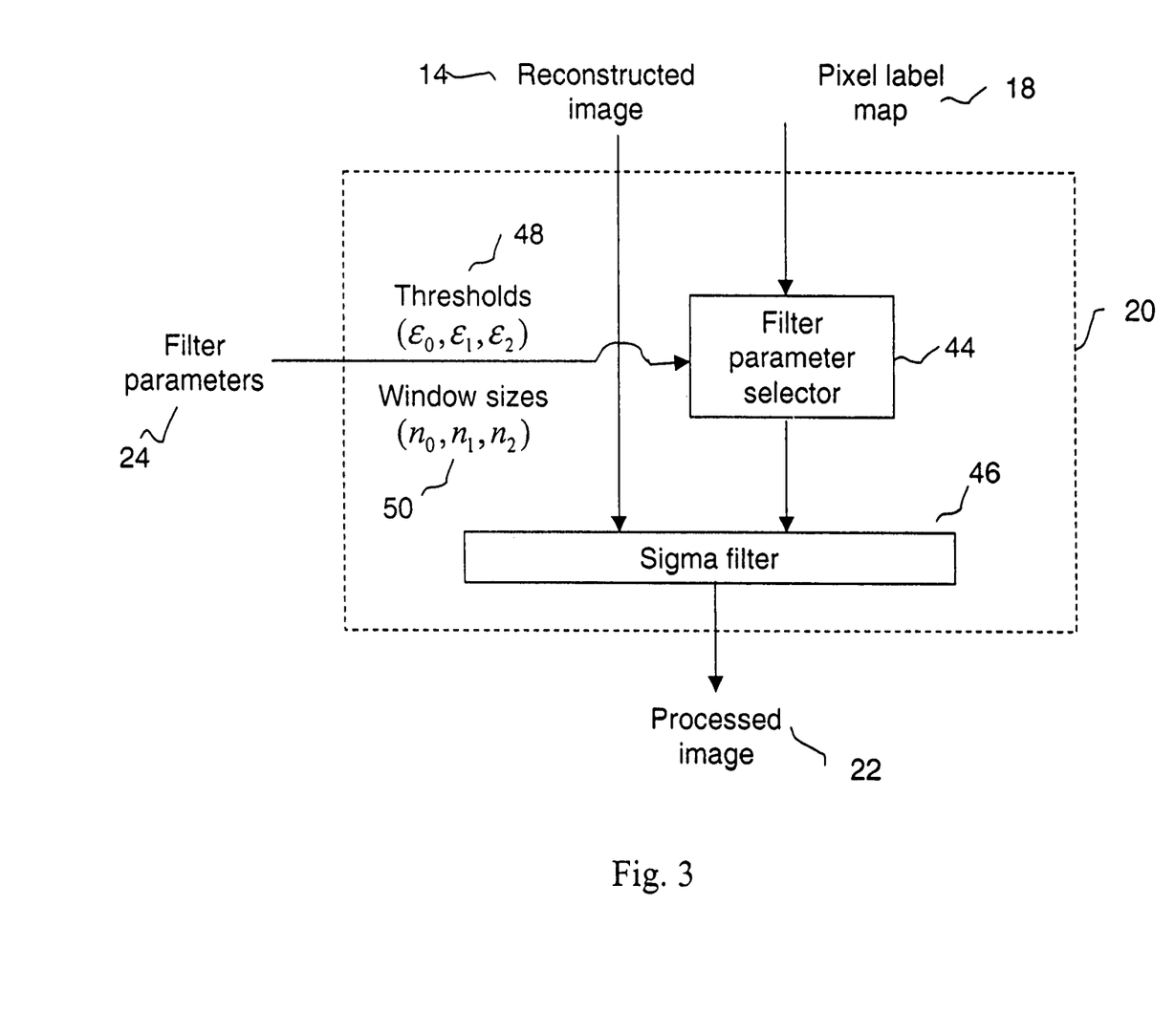
FIG. 3 is a block diagram illustrating the operation of a filtering unit for filtering the image pixels.

Referring to FIG. 3, a block diagram is shown that illustrates the detailed operation of the filtering unit 20. The filtering unit 20 receives the pixel label map 18 and filter parameters 24, and each pixel of the reconstructed image 14 is filtered according to the filter parameters that are associated with its corresponding pixel label to produce a processed image 22. Each type of pixel (low detail, high detail, and boundary) has associated parameters that are provided by the filter parameter generator 26. The operation of the filter parameter generator will be described shortly. In U.S. Pat. No. 6,427,031 by Price, the filtering of the pixels is achieved using two different filtering techniques. Each low detail pixel is filtered with an 11×11 Gaussian filter to provide significant smoothing of blocking artifacts, and each boundary pixel is filtered using one of four 5×5 directional filters. The directional filters attempt to remove ringing artifacts while preserving edges. As noted previously, our experience is that the directional filters do not perform as desired, and the result is a loss of sharpness. In addition, the use of very different filtering methods for the low detail pixels and the boundary pixels can produce objectionable switching artifacts between adjacent areas in the image. To overcome these limitations, the present invention uses a single filtering method with different filter parameters for the low detail and boundary pixels. The same filtering method can also be applied to the high detail pixels to further reduce artifacts if desired. In contrast, the method in U.S. Pat. No. 6,427,031 by Price does not provide for any processing of the high detail pixels.

The filtering method of the present invention is based upon a nonlinear spatial filter called the "sigma" filter as described by J.-S. Lee in "Digital Image Smoothing and the Sigma Filter", *Computer Vision, Graphics, and Image Processing*, Vol. 24, 1983, pp. 255–269. The sigma filter has several properties that make it particularly suitable for the reduction of compression artifacts. However, it will be obvious to those skilled in the art that other nonlinear spatial filters could be used to provide similar effects. The sigma filter performs pixel averaging over a window that is centered about the current pixel that is being processed. Typically, the window is an n×n square window, but it can be rectangular or even arbitrary in shape. We will only consider square windows without loss of generality. Pixels within the n×n window are either included or excluded from the pixel averaging on the basis of the absolute difference between each pixel value and the center pixel value. Mathematically, the sigma filter can be represented as:

$$\hat{x}_c = \sum_{i=0}^{n-1}\sum_{j=0}^{n-1} \alpha_{ij} x_{ij} \Big/ \sum_{i=0}^{n-1}\sum_{j=0}^{n-1} \alpha_{ij}, \quad (1)$$

where $$\alpha_{ij}=1 \text{ if } |x_c - x_{ij}| \le \epsilon, \text{ 0 otherwise.} \quad (2)$$

and $x_c$ is the original center pixel value, $\hat{x}_c$ is the filtered center pixel value, the $x_{ij}$'s are the pixel values within the n×n window that is centered on $x_c$, and $\epsilon$ is a threshold that controls the degree of filtering. Larger values for $\epsilon$ will result in the inclusion of more pixel values in the average for a given center pixel and hence will result in more smoothing. Note that for $\epsilon=0$, the center pixel value is not modified, which is equivalent to not performing any filtering.

If a sigma filter is applied to a compressed image, it is possible to remove blocking and ringing artifacts through an appropriate selection of the threshold $\epsilon$ for the different pixel types (low detail, boundary, and high detail). The sigma filter threshold provides a convenient parameter than can be easily adjusted as a function of the pixel label and the compression level. Referring to FIG. 3, a filter parameter selector 44 receives three sigma filter threshold values ($\epsilon_0$, $\epsilon_1$, $\epsilon_2$) 48, which correspond to the three types of pixel labels (high detail=0, low detail=1, boundary=2). Each pixel in the reconstructed image 14 is filtered using a sigma filter 46 with a threshold selected in accordance with the pixel's label. As mentioned, if the corresponding threshold value for the given pixel label is zero, the effective result is that no filtering is performed. For high detail pixels, it may be advantageous to use a threshold of zero as it can greatly reduce the total number of filtering operations in an image, and artifacts are inherently less visible in the high detail regions because the high activity image content provides a masking signal.

The size of the n×n sigma filter window is also an important parameter in the operation of the present invention. Referring again to FIG. 3, the filtering unit 20 receives three sigma filter window sizes ($n_0$, $n_1$, $n_2$) 50, which again correspond to the three types of pixel labels (high detail=0, low detail=1, boundary=2). Large values for n can provide a greater reduction in artifacts, but they require more computations and they may also lead to blurring of desirable image content. Because blocking and ringing artifacts in JPEG compressed images occur over 8×8 blocks of pixels, the size of the sigma filter window must be sufficiently large to span across block boundaries. As a result, typical values for n are 7, 9, or 11. As noted previously, the image content provides a masking signal that lowers the visibility of artifacts in the high detail pixel areas, and it can be beneficial to reduce the sigma filter window size for high detail pixels. e.g., n=3 or 5 if the corresponding high detail threshold is non-zero. Furthermore, it may be desirable to only filter the high detail pixels that are located adjacent to the boundary between 8×8 blocks. These modifications helps to preserve desirable image content in the high detail regions, while still providing some reduction in artifacts.

A central feature of the present invention is the method for generating the threshold values ($\epsilon_0$, $\epsilon_1$, $\epsilon_2$) 48 that are used by the sigma filter 46. The highest image quality is obtained when the thresholds are matched to the degree of compression that has been applied to the image. The degree of compression is directly related to the severity of the blocking and ringing artifacts that occur in the reconstructed image 14. As noted previously, blocking artifacts are primarily caused by excessive quantization of low frequency DCT coefficients, while ringing artifacts are primarily caused by excessive quantization of mid/high frequency DCT coefficients. Recall that the quantization that is applied to each DCT coefficient is specified by the JPEG q-table. Because blocking artifacts are most noticeable in low detail regions, the sigma filter threshold for low detail pixels is related to the low frequency JPEG q-table values. Likewise, ringing artifacts are most noticeable in boundary regions, and the sigma filter threshold for the boundary pixels is related to the mid/high frequency JPEG q-table values.

Figure 4:
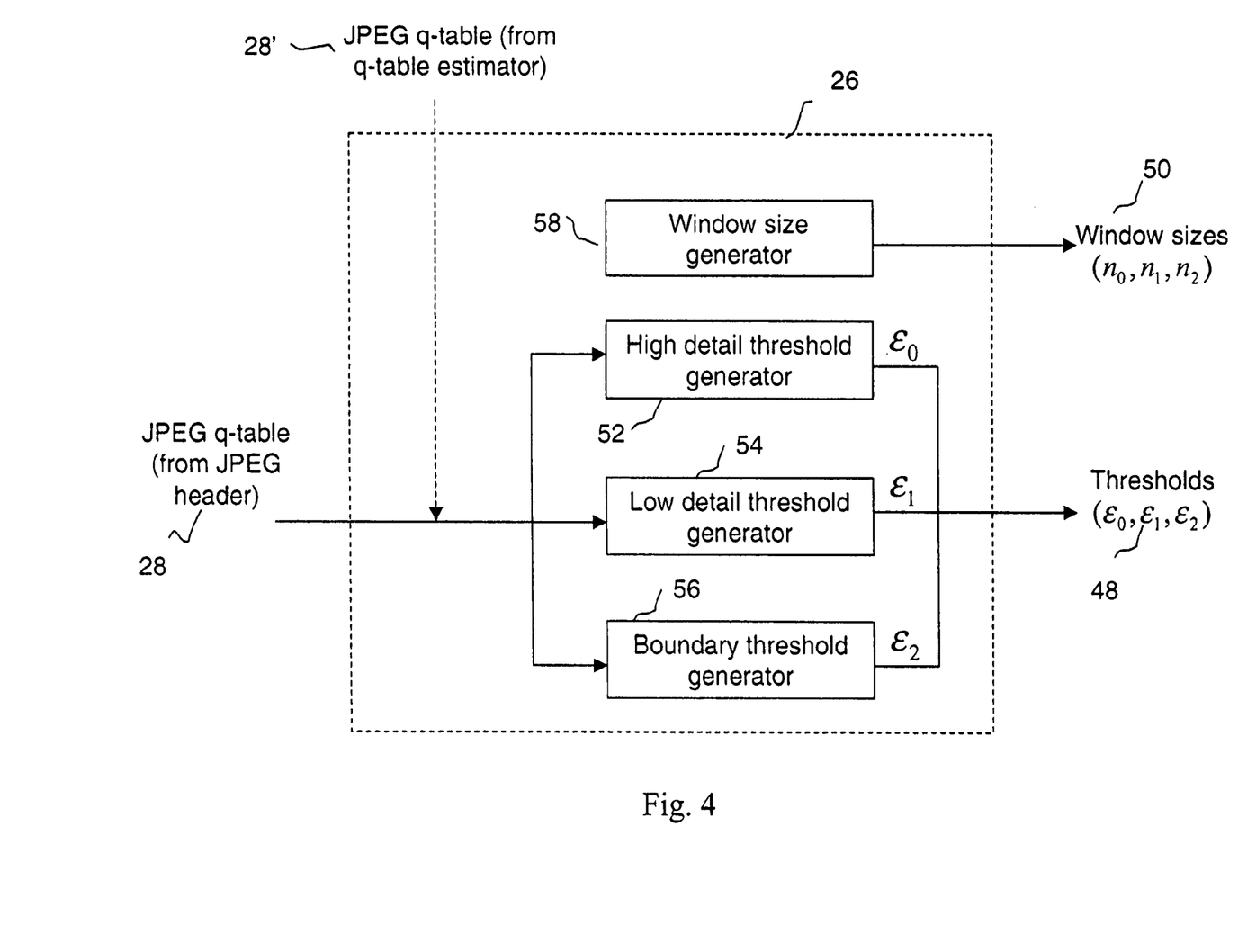
FIG. 4 is a block diagram illustrating the operation of a filter parameter generator.

The task of producing the sigma filter threshold values is accomplished using a filter parameter generator 26, and its detailed operation is illustrated in FIG. 4. The JPEG q-table 28 (or 28') is provided as input to the filter parameter generator, either directly from the JPEG header if the JPEG file is available or through a q-table estimator, if only a reconstructed image is available. The JPEG q-table values are provided to a high detail threshold generator 52, low detail threshold generator 54, and boundary threshold generator 56. Each of these threshold generators computes an appropriate threshold from the q-table values.

Figure 5:
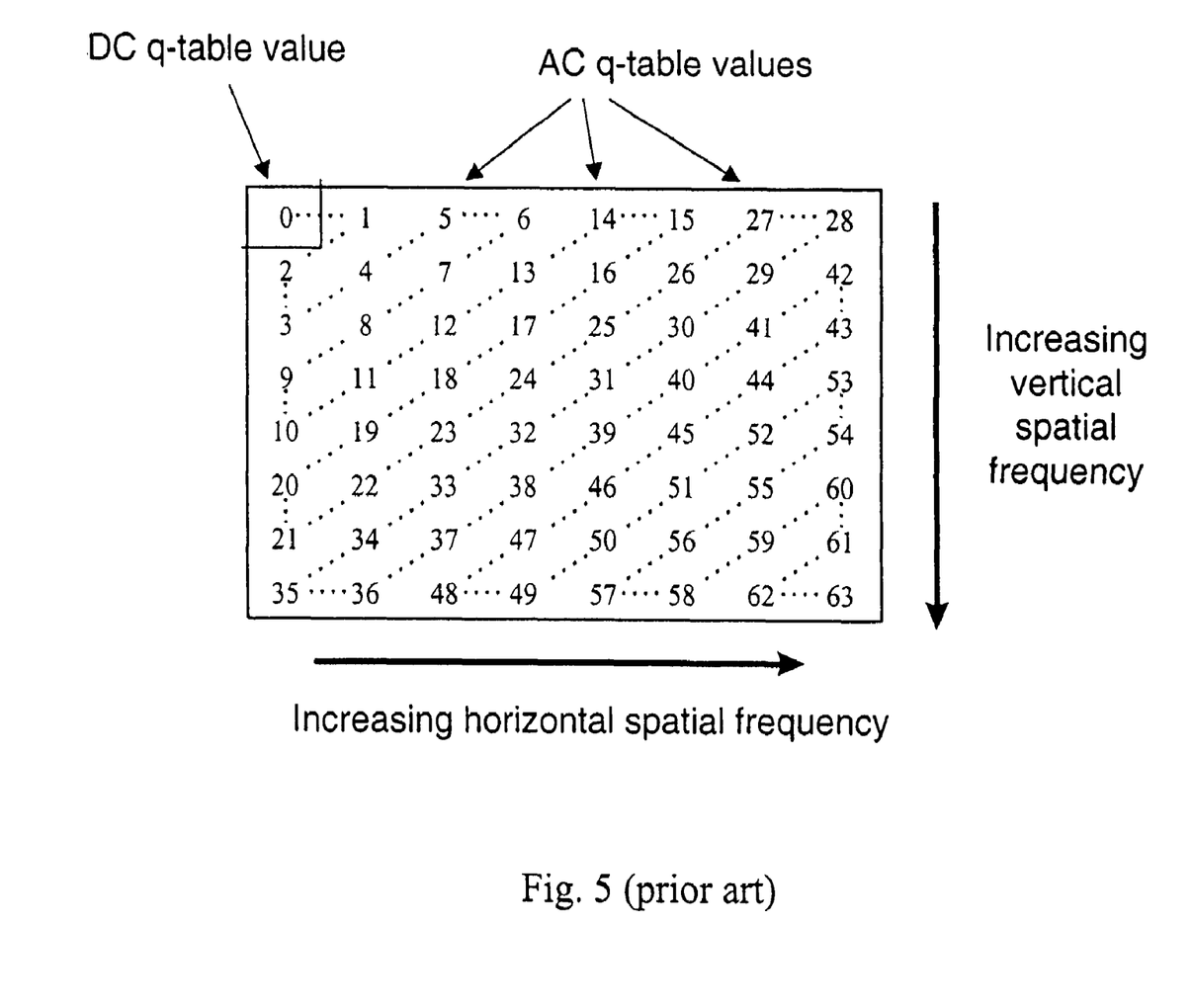
FIG. 5 illustrates the zigzag indexing of the JPEG q-table values.

The computation of the thresholds from the JPEG q-table values can be performed with mathematical functions and/or lookup tables. Referring to FIG. 5, the various elements of a JPEG q-table are typically referenced using a zigzag scan notation, which roughly orders the values from the lowest frequency (DC) to highest AC frequency. Denote the DC q-table value as $q_0$ and the AC q-table values as $q_1$, $q_2$, $q_3$, ... $q_{63}$. Because the blocking artifacts in low detail regions are related to the DC and low frequency AC q-table values, the low detail threshold generator uses these q-table values in its computations. For example, the low detail threshold $\epsilon_1$ could be linearly related to the DC q-table value $q_0$, i.e., $$\epsilon_1 = k_1 \cdot q_0, \quad (3)$$

where $k_1$ is a scaling constant that can be either predetermined or specified by a user. As the amount of compression is increased, the DC q-table value typically increases, and Eq. 3 will produce an increase in the low detail threshold accordingly. The value $k_1$ can also be increased or decreased to provide more or less artifact reduction, respectively, in the low detail regions. It may also be advantageous to include a few low frequency AC q-table values in the low detail threshold computation because these values also can contribute to blocking artifacts, e.g., $$\varepsilon_1 = k_1 \cdot \sum_{i=0}^{5} w_i \cdot q_i, \quad (4)$$

where $w_i$ is a weighting term for the $i^{th}$ q-table value. In Eq. 4, the DC q-table value and the first five AC q-table values are used in determining the low detail threshold, but other mathematical relationships (including nonlinear functions) will be obvious to those skilled in the art.

Similarly, the computation of the boundary threshold $\epsilon_2$ is based upon the mid/high AC q-table values because these values are directly related to the severity of ringing artifacts. For example, a weighted combination of mid/high frequency AC q-table values could be used:

$$\varepsilon_2 = k_2 \cdot \sum_{i=20}^{63} w_i \cdot q_i, \quad (5)$$

where $k_2$ is a scaling constant that can be either predetermined or specified by a user. Other mathematical relationships will be obvious to those skilled in the art. The exact relationship between the q-table values and the low detail and boundary thresholds can take many forms, but the general goal is to generate thresholds that provide the desired reduction in artifacts and are robust for different shapes and amplitudes of q-tables.

The generation of the high detail threshold $\epsilon_0$ in response to the compression level (i.e., q-table values) is more difficult to define than the low detail and boundary thresholds. This is because the high detail regions include both blocking and ringing artifacts, but the high activity image content in these regions also provides a significant masking of these artifacts. Because of these complex effects, it is typical to set the high detail threshold to a very low value, or even to zero, to preserve as much image content as possible. For example, the high detail threshold could be a function of the DC q-table $q_0$, as follows:

$$\epsilon_0 = k_0 \cdot q_0, \quad (6)$$

where $k_0$ is a scaling constant that can be predetermined or specified by a user. Moreover, in order to preserve maximum sharpness, it may be desirable to only filter the high detail pixels that are located adjacent to the boundary between the blocks.

It may also be advantageous to constrain the difference between the threshold values that are used for the low detail and boundary pixels. Because low detail pixels and boundary pixels are always adjacent, large differences in the thresholds for these pixel classes may produce an objectionable "switching" artifact, i.e., a discontinuity in signal characteristics between the adjacent regions. This is particularly the case for images that have inherent noise (from electronic sensors, film grain, etc.) because adjacent regions should have similar noise characteristics, but the use of very different thresholds for the low detail and boundary regions may result in adjacent regions that switch between being noisy and noise-free. These switching artifacts are easily detected when such processed images are viewed. In general, the boundary threshold $\epsilon_2$ is larger than the low detail threshold $\epsilon_1$ for a given level of compression, so an example of a constrained threshold difference is:

$$\epsilon_2 \leq \epsilon_1 + \Delta, \quad (7)$$

where $\Delta$ is the maximum allowed difference between the low detail and boundary thresholds. Typical values for $\Delta$ include 0, 1, 2, 3.

Referring again to FIG. 4, we show the generation of the sigma filter window size as being independent of the compression level (i.e., q-table). In practice, we have found that fixed window sizes yield acceptable results across a wide range of compression levels. However, it may be advantageous to also vary the window size as a function of the q-table. This could be accomplished using mathematical functions or lookup tables as was described for the thresholds.

We have described the adaptivity of the present invention with respect to the compression level. There may also be benefits to adapting the sigma filter parameters to other image meta-data such as the resolution of the reconstructed image, as well as various system components such as characteristics of the display device or media that will be used to view the processed images.

Although the present invention has been described heretofore in terms of its applicability to block-transform coded images, the same methods can be applied to images that have been compressed with other techniques that are not block-based. As example of such a compression technique is the JPEG 2000 compression standard, which uses a discrete wavelet transform (DWT) rather than the discrete cosine transform that is used in JPEG and MPEG. An image that has been compressed with JPEG 2000 will not suffer from blocking artifacts because the inherent nature of the DWT does not lead to block-related structures. However, the quantization of wavelet coefficients during JPEG 2000 compression will produce ringing artifacts near edges and low frequency artifacts in smooth regions. The present invention can be directly applied to JPEG 2000 compressed images to reduce such artifacts, although it may be desirable to use different processing parameters, such as the segmentation threshold and the filter thresholds, than were used for the JPEG-compressed images. As previously described, the various processing parameters can be adjusted in response to the compression level that was used for the JPEG 2000 compression.

Figure 6:
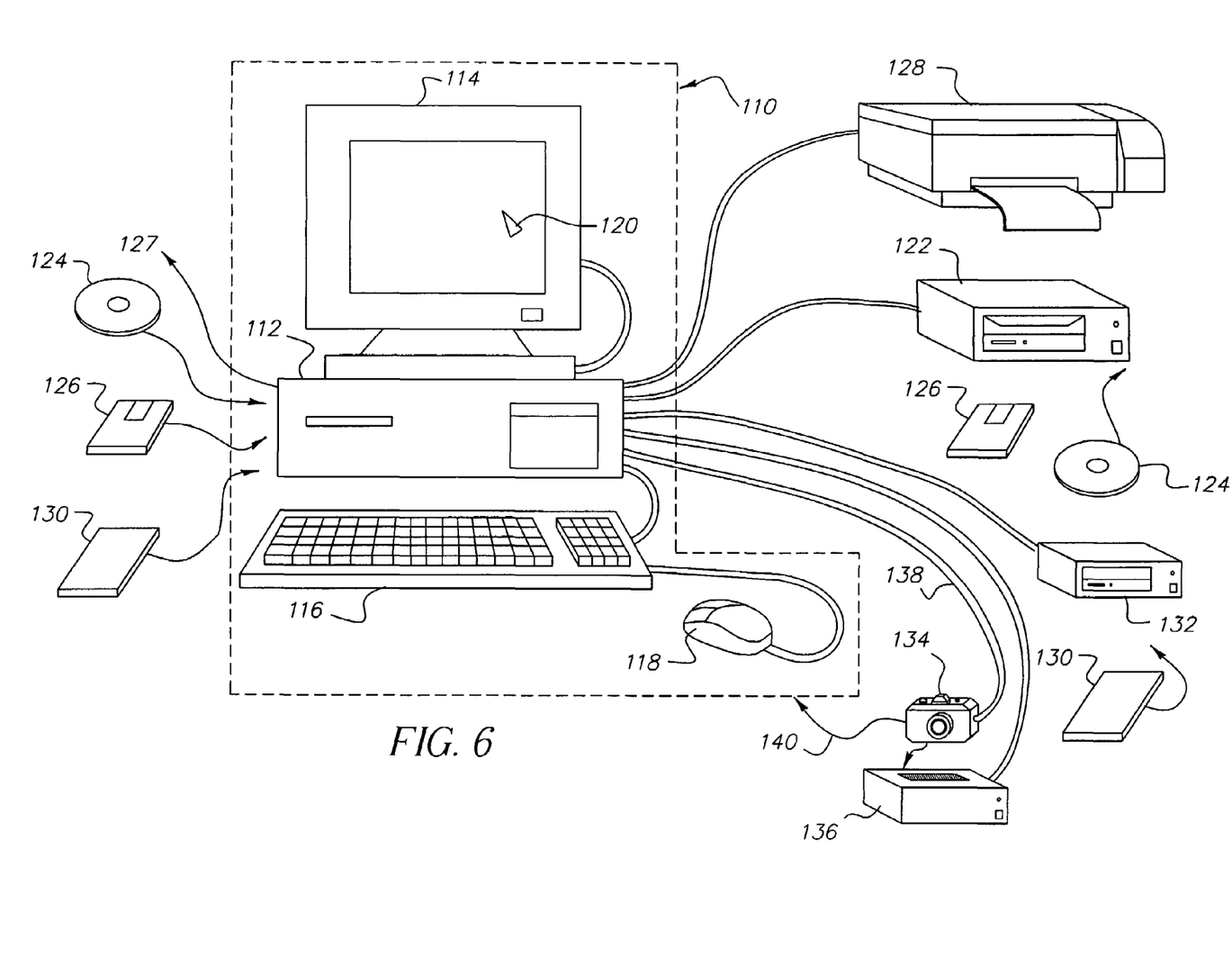
FIG. 6 is a pictorial diagram of a computer system for implementing the present invention.

Referring to FIG. 6, there is illustrated a computer system 110 for implementing the present invention. Although the computer system 110 is shown for the purpose of illustrating a preferred embodiment, the present invention is not limited to the computer system 110 shown, but may be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a means of inputting the software programs and other information to the microprocessor based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122 which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera 134 or a scanner (not shown). Images may also be input directly from the digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

The specific algorithm disclosed in the preferred embodiment of the present invention for removing blocking and ringing artifacts may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cellphone that can be used as a processing unit, a display unit, or a unit to give processing instructions), and as part of an image processing service offered via the World Wide Web.

Accordingly, the present invention can be used as a processing method within many different imaging systems. For example, walk-up photo kiosks are now common, and these devices are typically able to accept compressed files from various digital storage media such as CDs, floppies, memory flashcards, etc. A user can input a compressed file to the photo kiosk, and the file is then decompressed and a print is made from the reconstructed image. By including the present invention in such a system, it is possible for the user to process an image with the artifact removal method, thereby improving the overall image quality. Because of the automatic adaptation of the filter parameters to the compression level, the user need only select whether or not the artifact removal is applied. However, it may also be advantageous to include one or more controls to vary the degree of artifact removal in accordance with a user's preferences. These controls could be used to adjust the scaling constants that are used to compute the sigma filter thresholds from the q-table values as in Eqs. (3)–(5). In a similar manner, the present invention could be used in other types of digital photofinishing systems that receive compressed files as inputs.

Another application of the present invention is in digital cameras, where a captured image is compressed prior to being saved on the camera's storage media. Because the artifact removal method can improve the quality of a compressed image, it is possible to compress an image to a smaller filesize than would normally be used and yet still obtain the same final image quality on the reconstructed image. This allows more images to be saved on the camera's storage media. The artifact removal method could be included in the camera itself, or it could be made available as part of separate image processing and/or display software.

The invention has been described in detail with particular reference to certain preferred embodiments thereof, but it will be understood that variations and modifications can be effected within the spirit and scope of the invention.

PARTS LIST

10 JPEG-compressed image
12 JPEG decompressor
14 reconstructed image
16 segmentation unit
18 pixel label map
20 filtering unit
22 processed image
24 filter parameters
26 filter parameter generator
28 JPEG q-table
30 q-table estimator
32 local activity map
34 local activity unit
36 low detail threshold Tld
38 low detail labeling unit
40 low detail map
42 boundary pixel labeling unit
44 filter parameter selector
46 sigma filter
48 sigma filter thresholds ($\epsilon_0, \epsilon_1, \epsilon_2$)
50 sigma filter window sizes ($n_0, n_1, n_2$)
52 high detail threshold generator
54 low detail threshold generator
56 boundary threshold generator
58 window size generator
110 computer System
112 microprocessor-based Unit
114 display
116 keyboard
118 mouse
120 selector on display
122 disk drive unit
124 compact disk—read only memory (CD-ROM)
126 floppy disk
127 network connection
128 printer
130 personal computer card (PC card)
132 PC card reader
134 digital camera
136 camera docking port
138 cable connection
140 wireless connection

What is claimed is:

1. A method for removing artifacts in a digital image that has been decoded from a compressed representation of the image, where the digital image is represented by a plurality of pixels, comprising the steps of:
   segmenting the pixels of the digital image into low detail pixels, high detail pixels, and boundary pixels; and
   applying a single filtering method to each pixel in the digital image, wherein separate filter parameters are selected for the filtering method for the low detail, high detail, and boundary pixels.

2. The method according to claim 1, wherein the compressed representation of the image was produced using a discrete cosine transform.

3. The method according to claim 1, wherein the compressed representation of the image was produced using a discrete wavelet transform.

4. The method according to claim 1, wherein the single filtering method is a non-linear filtering method.

5. The method according to claim 4, wherein the non-linear filtering method is implemented as a sigma filter.

6. The method according to claim 5, wherein the filter parameters include sigma filter thresholds and sigma filter window sizes.

7. The method according to claim 1, wherein the filter parameters include a dependence upon the compression level that was used in encoding the compressed representation of the image.

8. The method according to claim 7, wherein the filter parameters for the low detail pixels depend only upon low frequency ones of said quantization parameters.

9. The method according to claim 7, wherein the filter parameters for the boundary pixels depend only upon mid and high frequency ones of said quantization parameters.

10. The method according to claim 1, wherein the filter parameters include a dependence upon a user-specified scaling factor.

11. The method according to claim 1, wherein the filter parameters include a dependence on a resolution of the digital image.

12. The method according to claim 1, wherein the filter parameters include a dependence on characteristics of a display device or media that is used to view the digital image.

13. The method according to claim 1, wherein the step of segmenting includes comparing a local activity at each pixel to a predetermined threshold and labeling a pixel as a low detail pixel if the local activity is less than or equal to the threshold.

14. The method according to claim 1, wherein the step of segmenting includes determining the boundary pixels as pixels that are located within a predetermined area of a predetermined number of low detail pixels.

15. A computer storage medium having instructions stored therein for causing a computer to perform the method of claim 1.

16. A method for removing artifacts in a digital image that has been decoded from a compressed representation of the image, where the digital image is represented by a plurality of pixels each having a specific local activity, comprising the steps of:
   segmenting the pixels of the digital image into a plurality of different categories based on the local activity of each of the pixels; and
   applying a filter to each pixel in the digital image, wherein separate filter parameters are selected for the different categories of pixels, and the filter parameters include a dependence upon a characteristic of the compression that was used in encoding the compressed representation of the images.

17. The method according to claim 16, wherein the compressed representation of the image was, produced using a discrete cosine transform.

18. The method according to claim 16, wherein the compressed representation of the image was produced using a discrete wavelet transform.

19. The method according to claim 16, wherein the step of segmenting the pixels includes segmenting the pixels into categories comprising at least low detail pixels and boundary pixels.

20. The method according to claim 19, wherein the filter parameters, for a given level of compression, are additionally dependent upon a relationship between a value of the parameters for the low detail pixels and a value of the parameters for the boundary pixels, whereby the relationship constrains a difference between the values to a predetermined value.

21. The method according to claim 16, wherein the filter parameters include a dependence upon compression level that was used in encoding the compressed representation of the image.

22. The method according to claim 21, wherein the filter parameters for the low detail pixels depend only upon low frequency ones of said quantization parameters.

23. The method according to claim 21, wherein the filter parameters for the boundary pixels depend only upon mid and high frequency ones of said quantization parameters.

24. The method according to claim 19, wherein the step of segmenting the pixels includes additionally segmenting the pixels into high detail pixels.

25. The method according to claim 24 wherein the step of applying a filter comprises, besides filtering the low detail pixels and the boundary pixels, filtering only the high detail pixels that are located adjacent to a block boundary.

26. A computer storage medium having instructions stored therein for causing a computer to perform the method of claim 16.

27. A system for removing artifacts in a digital image that has been decoded from a compressed representation of the image, where the digital image is represented by a plurality of pixels, said system comprising:
a first processing stage for segmenting the pixels of the digital image into low detail pixels, high detail pixels, and boundary pixels; and
a second processing stage for applying a single filtering method to each pixel in the digital image, wherein separate filter parameters are selected for the low detail, high detail, and boundary pixels.

28. The system according to claim 27, wherein the compressed representation of the image was produced using a discrete cosine transform.

29. The system according to claim 27, wherein the compressed representation of the image was produced using a discrete wavelet transform.

30. The system according to claim 27, wherein the single filtering method is a non-linear filtering method.

31. The system according to claim 30, wherein the non-linear filtering method is implemented as a sigma filter.

32. The system according to claim 31, wherein the filter parameters include sigma filter thresholds and sigma filter window sizes.

33. A system for removing artifacts in a digital image that has been decoded from a compressed representation of the image, where the digital image is represented by a plurality of pixels each having a specific local activity, said system comprising:
a first processing stage for segmenting the pixels of the digital image into a plurality of different categories based on the local activity of each of the pixels; and
a second processing stage for applying a filter to each pixel in the digital image, wherein separate filter parameters are selected for the different categories of pixels, and the filter parameters include a dependence upon a characteristic of the compression that was used in encoding the compressed representation of the images.

34. The system according to claim 33, wherein the compressed representation of the image was produced using a discrete cosine transform.

35. The system according to claim 33, wherein the compressed representation of the image was produced using a discrete wavelet transform.

36. The system according to claim 33, wherein the first processing stage segments the pixels into categories comprising at least low detail pixels and boundary pixels.

37. The system according to claim 36, wherein the filter parameters, for a given level of compression, are additionally dependent upon a relationship between a value of the parameters for the low detail pixels and a value of the parameters for the boundary pixels, whereby the relationship constrains a difference between the values to a predetermined value.

38. The system according to claim 33, wherein the filter parameters include a dependence upon a quantization level that was used in encoding the compressed representation of the image.

39. The system according to claim 38, wherein the filter parameters for the low detail pixels depend upon low frequency quantization parameters.

40. The system according to claim 38, wherein the filter parameters for the boundary pixels depend upon mid and high frequency quantization parameters.

41. A method for removing artifacts in a digital image decoded from a compressed image, the digital image having a plurality of pixels, the method comprising the steps of:
segmenting the pixels of the digital image into three groups: low
detail pixels, boundary pixels, and high detail pixels, each of said groups being exclusive of pixels of the other said groups; and
filtering said digital image, said filtering using different filter parameters for each of said groups.

42. The method of claim 41 wherein said segmenting further comprises:
segmenting the pixels of the digital image into low detail pixels and other pixels; and
segmenting said other pixels into boundary pixels and high detail pixels.

43. The method of claim 41 wherein said segmenting further comprises: determining a map of local activity values of said digital image, said local activity values each being associated with a respective said pixel;
assigning said pixels to said groups using said map.

44. The method of claim 43 wherein said segmenting further comprises assigning to said group of low detail pixels, ones of said pixels having respective said local activity values less than or equal to a predetermined threshold.

45. The method of claim 43 wherein said segmenting further comprises: determining a number of said low detail pixels within a
predetermined area of each of said other pixels to provide a low detail pixel number; and
assigning to said group of boundary pixels, ones of said other pixels having a respective said low detail pixel number greater than a predetermined number.

46. The method of claim 41 wherein said filtering further comprises filtering with a sigma filter and said filter parameters are sigma filter thresholds and sigma filter window sizes.

47. The method of claim 46 wherein the filter parameters for the low detail pixels depend only upon low frequency quantization parameters of the compressed image and the filter parameters for the boundary pixels depend only upon mid and high frequency quantization parameters of the compressed image.

48. A system for removing artifacts in a digital image decoded from a compressed image, the digital image having a plurality of pixels, the system comprising:

a first processing stage segmenting the pixels of the digital image into three groups: low detail pixels, boundary pixels, and high detail pixels, each of said groups being exclusive of pixels of the other said groups; and a second processing stage filtering said digital image, said filtering using different filter parameters for each of said groups.

\* \* \* \* \*